J. F. KNOWLTON.
POCKET KNIFE.
APPLICATION FILED JAN. 27, 1916.
1,179,111.
Patented Apr. 11, 1916.
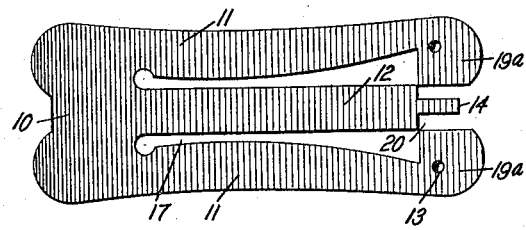
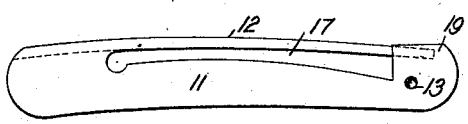
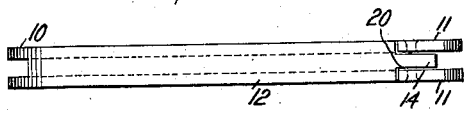
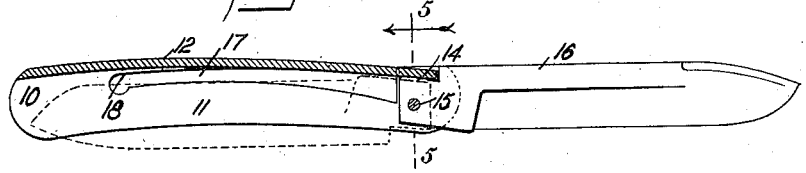
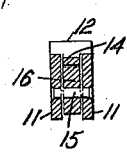
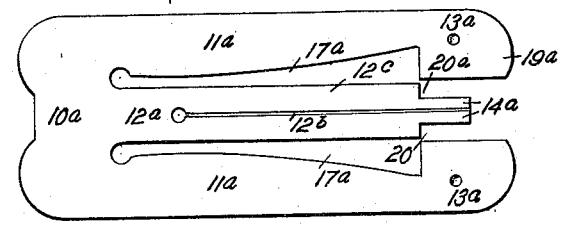
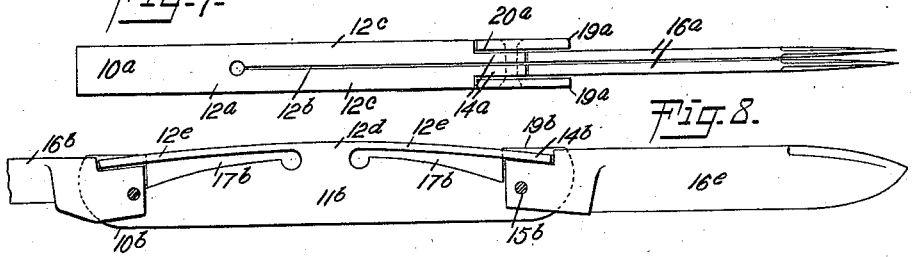
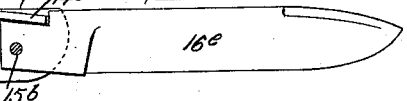
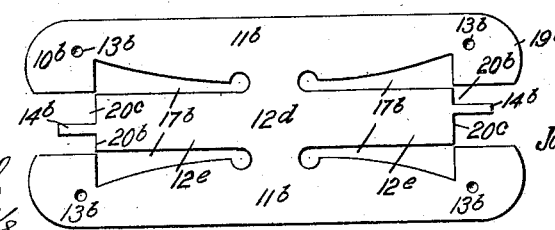
WITNESSES
INVENTOR
Jay F. Knowlton
ATTORNEYS
THE COLUMBIA PLANOGRAPH CO., WASHINGTON, D. C.

UNITED STATES PATENT OFFICE.

JAY F. KNOWLTON, OF HIBBING, MINNESOTA.

POCKET-KNIFE.

1,179,111.   Specification of Letters Patent.   Patented Apr. 11, 1916.

Application filed January 27, 1916. Serial No. 74,615.

*To all whom it may concern:*

Be it known that I, JAY F. KNOWLTON, a citizen of the United States, and a resident of Hibbing, in the county of St. Louis and State of Minnesota, have invented a new and Improved Pocket-Knife, of which the following is a full, clear, and exact description.

My invention relates to knives such as pocket knives including a handle and a blade pivoted to fold into the handle, or to be disposed in line with the handle for use.

The invention has for an object to provide a knife of the class referred to, the complete handle of which, including the spring will be cheaply produced in single structure.

A further object of my invention is to produce a knife of the class referred to, in which the handle with its integral spring will have increased strength and durability as compared with similar knives produced by ordinary methods.

In carrying out my invention in practice, I first produce a single handle blank with members thereon to constitute the sides and spring, and the blank is then bent and swaged to bring the side members into proper position with the spring constituting the whole back of the handle.

The invention will be particularly explained in the specific description following.

Reference is to be had to the accompanying drawings forming a part of this specification in which similar reference characters indicate corresponding parts in all the views.

Figure 1 is a plan view of a blank for producing my improved handle in the form to receive a single blade. Fig. 2 is a side elevation of the handle formed from said blank; Fig. 3 is a back view thereof; Fig. 4 is a longitudinal vertical section of the complete knife with the blade in open position; Fig. 5 is a cross section on the line 5—5, Fig. 4; Fig. 6 is a plan view of a modified form of the blank; Fig. 7 is a back view of a knife having a handle produced from the blank shown in Fig. 6, with two blades in position on the handle at one end; Fig. 8 is a longitudinal vertical section of a handle embodying my invention and accommodating a single blade at each end; Fig. 9 is a plan view of the blank from which the handle shown in Fig. 8 is produced.

In carrying out my invention in the form shown in Figs. 1 to 5, a handle blank is produced, designated generally by the numeral 10. The blank presents three longitudinally ranging members; the side members 11 to constitute the sides of the knife, the intermediate member 12 being resilient and constituting the knife spring. The several members are integral with each other at the rear end. At the forward end the side members 11 have holes 13 to receive a pivot pin 15 for securing a knife blade 16. The forward end of the spring 12 has a tongue 14 adapted to engage the tang of the knife in the usual manner. To form the handle, the blank is bent into U-shape in cross section, so that the sides will be at right angles to the original plane of the blank, to lie at each side of the central member 12 and the blank is so swaged as to bring the respective sides 11 beneath or within the plane of the member 12 as shown in Figs. 2 to 5. In this form the member 12 will form the complete back of the knife and will constitute a strong and durable spring. The openings 17 in the blank between the side members and the center member 12 produce clearance between the member 12 and the sides 11, as clearly shown in Figs. 2 and 4 and the desired resiliency is given to the member 12 by bending the same more or less toward the members 11, clearance always being preserved for movements of the spring in the opening and closing of the blade 16. In forming a handle from the blank, the latter is so swaged as to result in inwardly extending flanges 18 at the inner side of the resilient member 12 at the base of the latter and merging into the integral rear end of the handle, whereby to strengthen the resilient member and insure durability thereof. The sides 11, at the front ends, present rearwardly extending cheeks 19, integral with said sides 11 between which the tongue 14 is accommodated.

In the modification shown in Figs. 6 and 7, the handle blank 10$^a$ is formed with sides 11$^a$ having pin holes 13$^a$ and cheeks 19$^a$, corresponding with the first described form. The central member 12$^a$, however, is slitted for the major portion of its length, as at 12$^b$, to produce two spring members 12$^c$, each having its integral tongue 14$^a$ to engage the tangs of two blades 16$^a$, disposed side by side at one end of the knife. In this form the blank has longitudinal openings 17ª corresponding with the openings 17 to produce the clearance space referred to, beneath the resilient back of the knife and the sides.

In the modification shown in Figs. 8 and 9, the handle is formed with side members 11ᵇ and an intermediate member 12ᵈ. In this form the side members and intermediate member, instead of being integral with each other at one end of the blank, are integral at the center of the blank. Thus, the intermediate member will present two resilient members 12ᵉ extending from the center of the blank toward each end and provided with individual tongues 14ᵇ, out of line with each other to each engage a single blade 16ᵇ at each end of the handle. The side members 11ᵇ have cheeks 19ᵇ at the opposite ends formed with pin holes 13ᵇ to receive the pivot 15ᵇ. Also, openings 17ᵇ are formed in the blank to produce separate clearance spaces at each end of the handle for each resilient back member 12ᵉ.

As will be readily understood, the handle may be produced as described very cheaply and will possess the required strength to insure durability. At the same time, an effective spring action is insured for the blade or blades.

In all forms of the invention, it is to be observed that the free portions of the sides are swaged inwardly beneath the free portions of the resilient back member so as to be covered by the latter. Moreover, the openings, 17, 17ª, 17ᵇ, are such as to produce, in the blank, the cheeks 19, 19ª, 19ᵇ, projecting inwardly toward the tongue 14 which lies between said cheeks and is of less width than the body of the resilient member 12. The construction produces the necessary clearance beneath the resilient back between the said back and the opposed upper edges of the sides of the knife. The reduced tongues 14 for engaging the tang of a blade extend between the cheeks 19 which are accommodated in the rabbets that result from the reduced width of the said tongues. The rabbets are designated by the numeral 20 in the form shown in Figs. 1 to 5, by the numeral 20ª in Figs. 6 and 7, by the numerals 20ᵇ, 20ᶜ, in the form shown in Figs. 8 and 9. In the latter figures it will be noticed that the rabbets are of unequal depth owing to the tongues 14ᵇ being out of line.

Having thus described my invention I claim as new and desire to secure by Letters Patent:

1. A knife handle formed from a flat blank having side members and an intermediate member, said members being integral at one end with one another but otherwise separated, said blank being bent into U-shape in cross section, the said intermediate member being resilient and having at the free end thereof a tongue of reduced width, the side members projecting beyond the intermediate member and forming cheeks extending rearwardly at the sides of the reduced tongue and accommodating the latter, the cheeks being adapted to receive a knife blade beneath the said tongue, the resilient intermediate member, between the tongue thereof and the integral connection with the side members, having a width to overhang said side members except at the cheeks of the latter, and constitute the back of the handle, there being lateral openings in the sides of the handle beneath the resilient back member permitting a flexure of the back member toward and from the back edges of the side members.

2. A knife handle including side members and a resilient back member integral at one end with the side members but otherwise separate therefrom, to constitute the knife spring, the outer free end of said back member being rabbeted, forming a tongue of reduced width, the side members having cheeks at the outer ends thereof extending rearwardly into the rabbets of the back member, the said side members between the said cheeks and the integral connection with the back member being recessed, presenting openings beneath the back member.

In testimony whereof I have signed my name to this specification in the presence of two subscribing witnesses.

JAY F. KNOWLTON.

Witnesses:
W. R. SPENSLEY,
NORMAN F. CASWELL.

Copies of this patent may be obtained for five cents each, by addressing the "Commissioner of Patents, Washington, D. C."